United States Patent
Sherman et al.

(10) Patent No.: US 12,322,020 B1
(45) Date of Patent: Jun. 3, 2025

(54) SYSTEM APPARATUS AND METHOD FOR PROVIDING FACIAL EXPRESSION TO AVATARS

(71) Applicant: Goodsize, Inc., Wilmington, DE (US)

(72) Inventors: Sergei Sherman, Givatayim (IL); Dmitrii Ulianov, Ramat Gan (IL)

(73) Assignee: Goodsize, Inc., Wilmington, DE (US)

( * ) Notice: Subject to any disclaimer, the term of this patent is extended or adjusted under 35 U.S.C. 154(b) by 0 days.

(21) Appl. No.: 18/796,304

(22) Filed: Aug. 7, 2024

Related U.S. Application Data (60) Provisional application No. 63/603,700, filed on Nov. 29, 2023.

(51) Int. Cl.
*G06T 13/40* (2011.01)
*G06V 40/16* (2022.01)

(52) U.S. Cl.
CPC ............ *G06T 13/40* (2013.01); *G06V 40/174* (2022.01)

(58) Field of Classification Search
CPC ....... G06T 11/00; G06T 13/40; G06V 40/174; G06N 3/02; G06N 3/08; H04N 7/157
See application file for complete search history.

(56) References Cited

U.S. PATENT DOCUMENTS

| | | | | |
|---|---|---|---|---|
| 10,552,977 | B1* | 2/2020 | Theis | G06T 7/70 |
| 11,455,765 | B2* | 9/2022 | Long | G06N 3/08 |

OTHER PUBLICATIONS

"A morphable model for the synthesis of 3D faces." Volker Blanz and Thomas Vetter. In Proceedings of the 26th annual conference on Computer graphics and interactive techniques (SIGGRAPH '99). ACM Press/Addison-Wesley Publishing Co., USA, 187-194. https://doi.org/10.1145/311535.311556 (Year: 1999).*

* cited by examiner

*Primary Examiner* — Antonio A Caschera
(74) *Attorney, Agent, or Firm* — The Roy Gross Law Firm, LLC; Roy D. Gross (57) ABSTRACT

A system and method for providing a facial expression to a virtual avatar. The system includes a training system to train a neural network system to replace a face of the virtual avatar with a source face and to provide a facial expression of the source face to the face of the avatar in a real-time and an inference system configured to use the trained neural network system to provide one or more facial expressions of the source face to the face of the avatar in real-time to cause the one or more facial expressions of the avatar to imitate approximately in an exact manner the one or more facial expressions of a source face media which is represented by the virtual avatar.

20 Claims, 6 Drawing Sheets

SYSTEM APPARATUS AND METHOD FOR PROVIDING FACIAL EXPRESSION TO AVATARS

CROSS REFERENCE

This application is related to U.S. application No. 63/603,700 entitled "SYSTEM APPARATUS AND METHOD FOR GENERATING AVATAR" that was filed on Nov. 29, 2023.

TECHNICAL FIELD

Some embodiments described herein are generally related to generating a 3-D model of an avatar, more specifically, providing a facial expression to the 3-D model of an avatar.

BACKGROUND

The real-time animation and rendering of 3-D objects, specifically 3-D avatars, may result in poor-quality facial expressions using the existing 3-D rendering methods, which use a predefined number of resources.

Thus, facial expressions in 3-D avatars need to be produced more efficiently and with improved quality.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions made herein utilizing terms, such as, for example, processing," "computing," "calculating," "determining," "establishing," "analyzing," "checking," or the like, may refer to operation(s) and/or process(es) of a computer, a computing platform, a computing system, an artificial intelligent (AI) systems using computing resources, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one demonstrative embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or any other manner.

The term "module," as used hereinbelow, is an object file that contains code to extend the running kernel environment.

As used hereinbelow, the term "Artificial intelligence (AI)" refers to intelligence demonstrated by machines, unlike the natural intelligence displayed by humans and animals, which involves consciousness and emotionality. The term "artificial intelligence" is used to describe machines (or computers) that mimic "cognitive" functions that humans associate with the human mind, such as, for example, "learning" and "problem-solving."

The term "machine learning (ML)" as used hereinbelow is a study of computer algorithms configured to improve automatically based on a received. ML is a subset of artificial intelligence. Machine learning algorithms build a mathematical model based on sample data, known as "training data," to make predictions or decisions without being explicitly programmed to do so.

The term "deep learning," as used hereinbelow, is a class of machine learning algorithms that uses multiple layers to extract higher-level features from the raw input progressively. For example, in image processing, lower layers may identify edges, while higher layers may identify concepts relevant to a human, such as, for example, digits, letters, and/or faces.

The term "Artificial neural networks (ANNs), and/or neural networks (NNs), are computing systems vaguely inspired by the biological neural networks that constitute animal brains.

For example, an ANN is based on a collection of connected units or nodes called artificial neurons, which loosely model the neurons in a biological brain. An artificial neuron that receives a signal may process it and may signal neurons connected to it. For example, the "signal" at a connection is a real number, and the output of each neuron is computed by some non-linear functions of the sum of its inputs. The connections are called edges. Neurons and edges may have a weight that adjusts as learning proceeds. The weight increases or decreases the strength of the signal at a connection. Neurons may have a threshold such that a signal is sent only if the aggregate signal crosses that threshold. The neurons may be aggregated into layers. Different layers may perform different transformations on their inputs.

In embodiments of the present discloser, there is a plurality of ways to use non-wearable sensing technologies (like video) to monitor and analyze a subject and provide feedback to a user. For example, the feedback may be based on artificial intelligence (AI) trained on a dataset.

The term "dataset," as used hereinbelow, is related, but not limited to, to a dataset of human images, for example, human faces, annotated with attributes, e.g., keypoints related to, for example, the pose of a head and/or other body parts and/or the like.

The term "training," as used hereinbelow, is related to, but not limited to, the training method of one or more neural networks on one or more datasets to predict and/or to detect the attributes, e.g., a camera lens attribute. For example, a neural network may predict and/or detect one or more attributes according to a target image. The training may be done once, but not limited to, on the server.

The term "polygon mesh," as used hereinbelow is consisted of a set of polygonal faces, often triangles, that, taken together, form a surface covering of the object. The advantage of a surface mesh is that it is fast to generate and works very well for visualization.

The term "surface mesh," as used hereinbelow, is a collection of vertices, edges, and faces that defines the shape of a polyhedral object. The faces usually consist of triangles (triangle mesh), quadrilaterals (quads), or other simple convex polygons (n-gons) since this simplifies rendering, but they may also be more generally composed of concave polygons or even polygons with holes.

The term "fundamental matrix," as used hereinbelow, is a relationship between any two images of the same scene that constrains where the projection of points from the scene can occur in both images. The corresponding point in the other image may be constrained to a line.

The term "augmented reality (AR)," as used hereinbelow, is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects.

The term "mixed reality (MR)," as used hereinbelow, is the merging of real and virtual worlds to produce new environments and visualizations where physical and digital objects co-exist and interact in real-time. Mixed reality is a hybrid of reality and virtual reality. AR, a related term, takes place in the physical world, with information or objects added virtually. For example, there are many practical mixed reality applications, including design, entertainment, military training, and remote working. Furthermore, different display technologies may be used to facilitate interaction between users and mixed reality applications.

The term "3D avatar," as used hereinbelow, is used in 3D graphics when people operate 3D objects rendered to the screen. A 3D object is represented as a number of 3D meshes with corresponding material properties. When the 3D object represents a human, we call that 3D object a 3D avatar.

The term "shader," as used hereinbelow, is a program for rendering 3D objects to the screen. The shader defines the appearance of the 3D object on the screen. When defining the appearance of the 3D object on the screen, the shader may consider 3D objects, the 3D object materials, lighting on and/or of the 3D object in the scene, and the environment to produce an image that people consume from the screen.

The term "Blendshapes," as used hereinbelow, is a program configured to animate a face of an avatar. Blendshapes (a.k.a. Morphs) may be used to deform face geometry of an avatar in a particular way. For example, Blendshapes are coupled with a corresponding strength coefficient. The Bendshape is configured to change the way the avatar looks by changing the value of the coefficient. For example, adding "a smile" for the face of the avatar may be done by increasing Bendshape coefficient values, for example, from zero to one.

The term "visual media," as used hereinbelow is a broad term that covers any content that can be seen, including images and videos.

A disadvantage of using Blendshapes. is an unrealistic face movement, which may be an underrepresentation or misrepresentation of the human face in complex animation. For example, the most common ARK is Blendshapes contain ~52 Blendshapes (for reference, just a small smile activates 43 muscles).

Another disadvantage of the traditional Blendshapes method is that the face geometry changes from person to person. Hence, the Blendshapes for every person must be rebuilt manually. Otherwise, the face animations look misplaced or cringe.

A disadvantage of using shaders is unrealistic rendering. Shaders are hand-crafted by humans, and the computation budget for real-time rendering is limited, making it difficult to create convincing, true-to-life renderings of human 3D avatars. For example, recent avatar products like "Metahuman" (which is an application for creating photorealistic digital humans) require hundreds or thousands of shaders to render 3D avatars and a high-profile GPU to get real-time applications running smoothly. Still, the quality of "Metahumans" is insufficient to make people believe it's not 3D graphics.

Embodiments of this discloser may include a combination of classically rendered avatars with no/fewer Blendshapes that may be post-processed by a neuron network (NN) to generate high-fidelity avatars that have a natural look, preserve the person's identity, and do not require high computational power.

Figure 1:
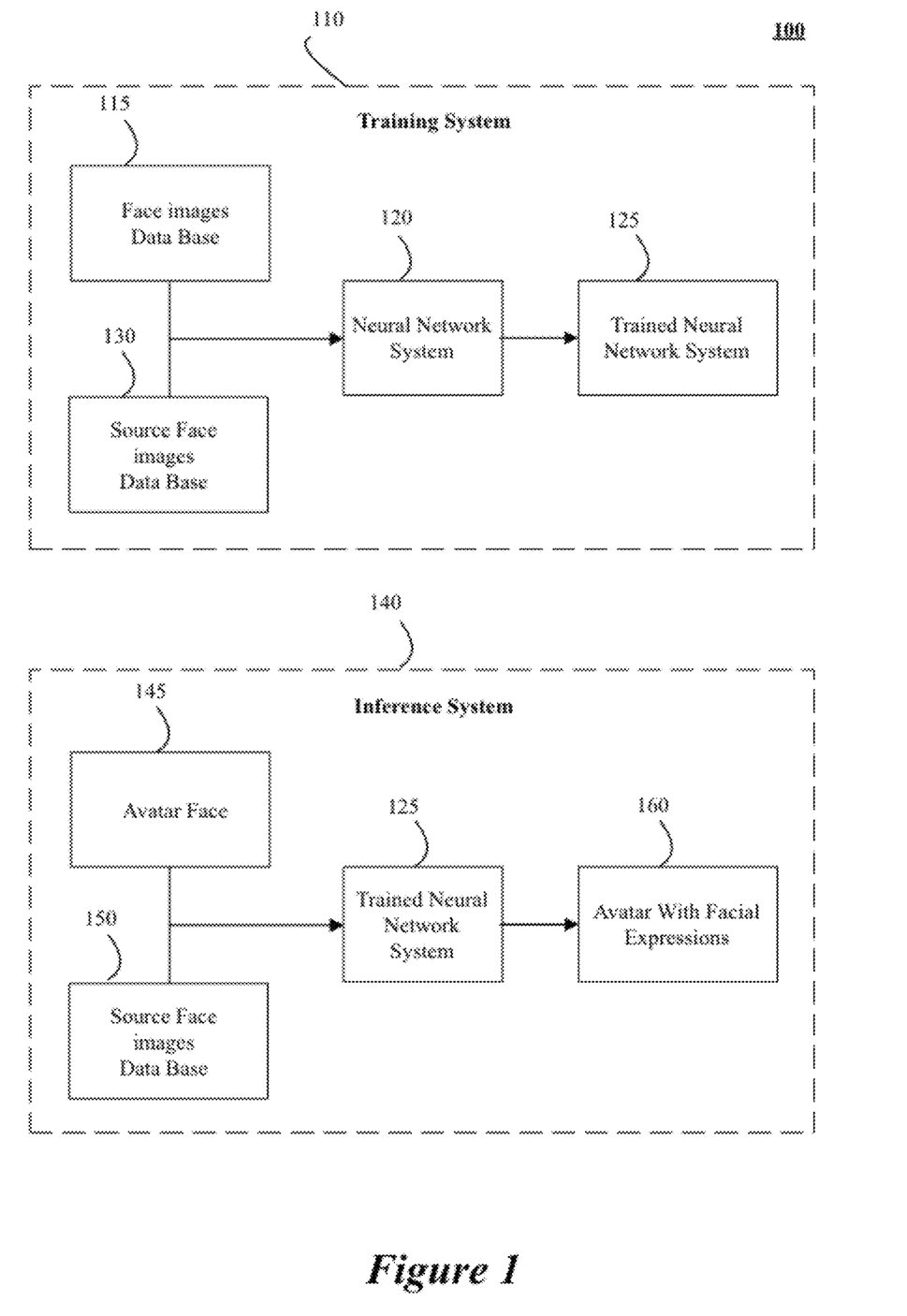
FIG. 1 illustrates a block diagram of a first system for providing a facial expression and animation to the 3-D model of an avatar according to some demonstrative embodiments.

Reference is now made to FIG. 1, which is an illustration of a system 100 for providing facial expression and animation to the 3-D model of an avatar according to some demonstrative embodiments.

According to some demonstrative embodiments, system 100 may have two phases of operation: a training system 110 configured to operate a training phase and an inference system 140 configured to operate an inference phase. For example, the training system 110 may include a first database 115, which may include a plurality of different videos and/or images that have a face on them, and a second database 130 may include a plurality of different videos and/or images that have a face on them and may be used as a source image, e.g., face, and may provide the images to a NN network system 120, to learn to replace faces on images and/or videos from the database 115 with the source faces/images from database 120. As a result of the training phase, the training system 110 may produce a trained NN system 125 to be used in the inference phase.

In some demonstrative embodiments, inference system 140 may include an avatar face 145, a source face images database 150, and the trained NN system 125.

In the inference phase, operated by inference system 140, a target image and/or video, e.g., the avatar face 145, and a source face image and/or video from database 150 may be processed by the trained NN system 125, to produce a target image and/or video with a source face on it, for example, an avatar with a facial expression 160.

In some demonstrative embodiments, the inference system 140 may be used as a system for rendering an avatar of a real human and may operate as follows:
1) Reconstruct—reconstructing a 3D model of the head from an image, e.g., a photo(s) of a person, by assigning either personalized or generic face Blendshapes to a face geometry, for example, reconstructing the avatar face 145.
2) Animate in 3D—applying an animation using face Blendspapes Blendshapes, bones, and/or any other classical animation method to transform geometry and materials based on one or more parameters. For example, this may be done by the trained NN system 125.
3) Render—using any kind of rendering engine to render an animated avatar, e.g., either in real-time or offline rendering into the video. For example, this may be done by the trained NN system 125.
4) Postprocess—For each frame of a video, apply a neural network and/or a more complex system, possibly consisting of multiple neural networks, as post-processing. This may occur either in real-time or offline on a rendered video. For example, the trained NN system 125 may do this to produce the avatar with the facial expression 160.

In some demonstrative embodiments, the neural network system 120 may be trained to:
Enhance or render a face image in order to preserve facial expression;
Replace the face of a person, e.g., a human, with the face of another person, e.g., another human, to preserve the facial expression of the other person, e.g., a human;
Replace render of an avatar face to face of a person, e.g., a human, to preserve the facial expression of the human; and
Upgrade the quality of the avatar render and the quality of the face animations.

It should be understood that the postprocessing phase may enhance the quality of the applied animations. However, postprocessing does not intend to change the semantics of the animation.

In another embodiment of the present disclosure, the system 100 may render an avatar of a real human without a Blendshapes medium. System 100 may use any existing 3D avatar of a real human by reconstructing their geometry.

Figure 2:
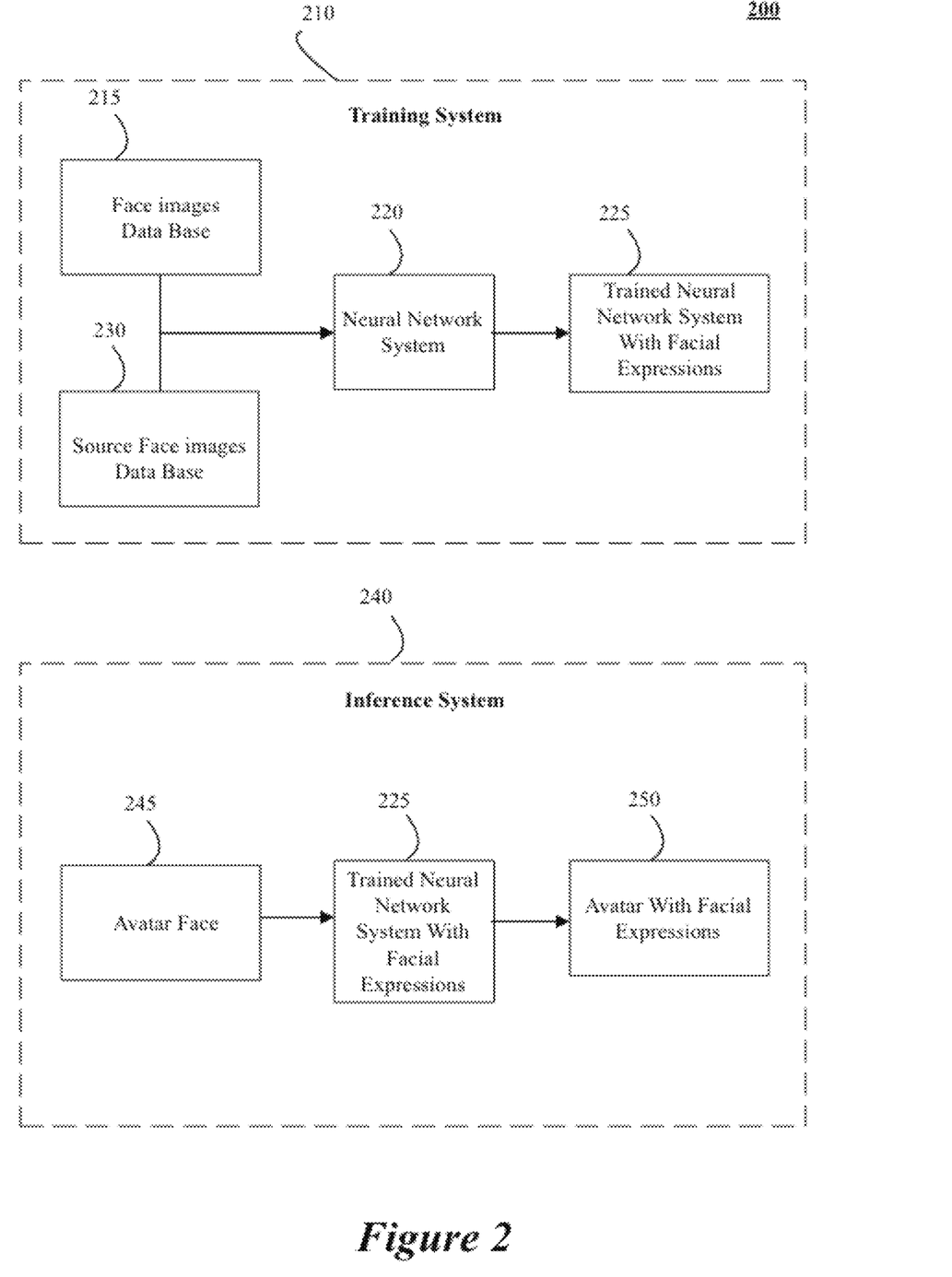
FIG. 2 illustrates a block diagram of a second system for providing a facial expression and animation to the 3-D model of an avatar according to some demonstrative embodiments.

Reference is made to FIG. 2, which is an illustration of a flow diagram 200 of a system for providing facial expression and animation to the 3-D model of an avatar according to some demonstrative embodiments.

In some demonstrative embodiments, system 200 may have two phases of operation: a training phase 210 and an inference phase 240. For example, in the training phase 210, a first database, e.g., a face images database 215, may include a plurality of different videos and/or images that have a face on them, and a second database, e.g., source face database 230, which may include a plurality of different videos and/or images that have a face on them and may be used as a source face to provide the images to a training system, e.g., a NN system 220.

In some demonstrative embodiments, NN system 220 may be configured to learn to replace faces on images and/or videos from the first database, e.g., face images database 215, with the source faces from the second database, e.g., source face images database 230. At the end of the training process, which is done by a training system 210, a trained NN system with facial expression is produced.

In some demonstrative embodiments, in the inference phase, processed by an inference system 240, facial expressions may be added to an avatar face 245 by the trained NN system 225 to produce an avatar with facial expressions 250 on it.

For example, the trained NN system 250 may be configured to replace the face of the target image and/or video, e.g., avatar face 245, with a source face to produce the avatar with facial expressions 250. For example, the trained NN system 225 may replace the face of the target avatar, e.g., avatar face 245, in the frame-by-frame of the target video with one or more face images of the source avatar, maintaining the facial expressions of the target image and/or video.

In some demonstrative embodiments, the trained NN system 225 for rendering an avatar of a real human having different facial expressions may operate as follows:
1) Reconstruct a 3-D model of the head from a photo(s) of a person, e.g. human.
2) Animate in 3-D the body of the avatar in the 3-D model but may not animate facial expressions of the reconstructed 3-D model of the head. It should be understood that with the embodiments of the invention, the head position may be either animated or not.
3) Render the animated avatar by a real-time or offline rendering engine into a video. It should be understood that any rendering engine may be used.
4) Set a video to drive facial expressions. For example, using a video containing anyone's face and copying facial expressions from that video onto our avatar using NN.
5) Postprocess by animating. For example, apply a neural network and/or a more complex system comprising multiple neural networks as a post-processing for each frame. This may be done either online in real-time or offline when the avatar's video has already been rendered.

The system for rendering an avatar may be configured to:
Copy the face from a video frame to an image and or render video and preserve facial expression from the driving video and/or particular frame.
Copy only facial expressions and/or part of facial expressions, e.g., lips movement, from driving video and/or frame to an image and/or render video without modifying the person's, e.g., human, identity on the image and/or the rendered video.

It should be understood that animating the 3D avatar by using a video of a person, e.g., from which facial expressions, head movements, etc. are copied may be achieved by a system based on neural networks that may transfer information from the video onto the rendered video and/or another video and/or image. Other systems using Blendshapes may also be used.

In some other demonstrative embodiments, any existing 3-D avatar may be used without creating an avatar of a real human by reconstructing their geometry.

Advantageously, a high-realism avatar with lower computing may be created. In embodiments of this discloser, the computational power used to achieve the same level of realism that achieved with prior art systems may be lower than the computational power required for the prior art methods and system. It may be lower since the requirements may include less work for humans (save time and money)

because the NN system 220 may be trained on real images. The NN system 220 may automatically learn "realism" from the images and/or video and may craft shades from the data.

Figure 6:
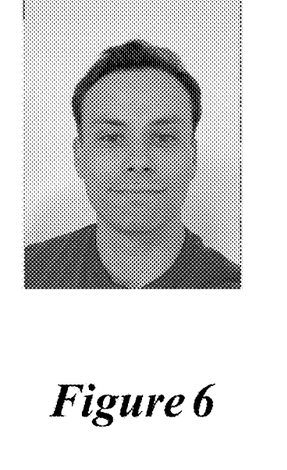
FIG. 6 is an image of the face of a human according to some demonstrative embodiments.

In some demonstrative embodiments of this disclosure, a photo may be taken to build the 3D model of the person see FIG. 6 of an example of a photo.

Figure 7:
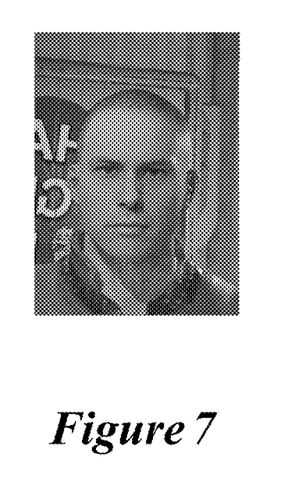
FIG. 7 is an image of the outcome of the post-processing of the image of FIG. 5 with the image of FIG. 6 according to some demonstrative embodiments.

The method may proceed with generating a 3D model based on the photo (see the example in FIG. 7, which illustrates a basic avatar based on the image.

In the next step an animation may applied based on a 3D model e.g., basic avatar. After generating a video from the basic avatar, at the post-processing phase, the NN system may take each frame and swap it with the original photo of the person, applied to the position of the 3D face and the exact looks, e.g., a smile, sad face and etc. For example, generating a first frame and replacing it with the frame on the video, generating a second frame and replacing it with the frame on the video, and so on, until all the frames of the video are replaced, if desire The Key values of this process may include more efficient rendering by using NN system for rendering in a 3D engine based on 2D images and on top of the 3D model, at the post-processing stage, creating a 3D avatar of the person, e.g., a human.

For example, the NN may be trained based on turning one photo of a person into another photo. A trained NN may operate on the target avatar based on trained animations and enhance the animation output.

It is to be understood that the system and/or the method of providing face expression to a face of a virtual avatar neural networks is described hereinabove by example only. Other embodiments may be implemented based on the detailed description and the claims that followed.

It is to be understood that like numerals in the drawings represent like elements through the several figures and that not all components and/or steps described and illustrated with reference to the figures are required for all embodiments or arrangements.

Figure 5:
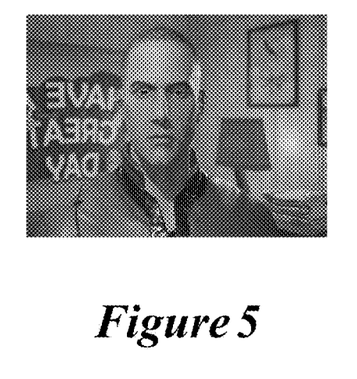
FIG. 5 is an image of the face of an avatar according to some demonstrative embodiments.

In some other demonstrative embodiments method of replacing faces using the systems of FIG. 1, FIG. 5, FIG. 6 and/or FIG. 7 is described now.

For example, trained NN 125 may receive a traditional 3D model of a person, such as, for example, the avatar face 145 (FIG. 5) and a source face image (FIG. 6) from the source face images database 150.

The trained NN system 125 may process the images and the outcome of the post-processing as an image of a new person (FIG. 7)

Figure 8:
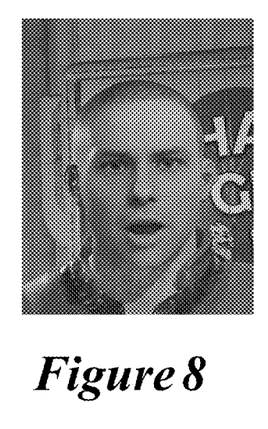
FIG. 8 is the image of FIG. 7 with a facial expression according to some demonstrative embodiments.

It should be understood that the animation may be generated prior to the post-processing and it the driver of the end result. The NN system may replace the image of the person, e.g., FIG. 6, and may take into consideration the facial expression of the underlying 3D model to produce an image with facial expressions as is shown in FIG. 8.

Figure 3:
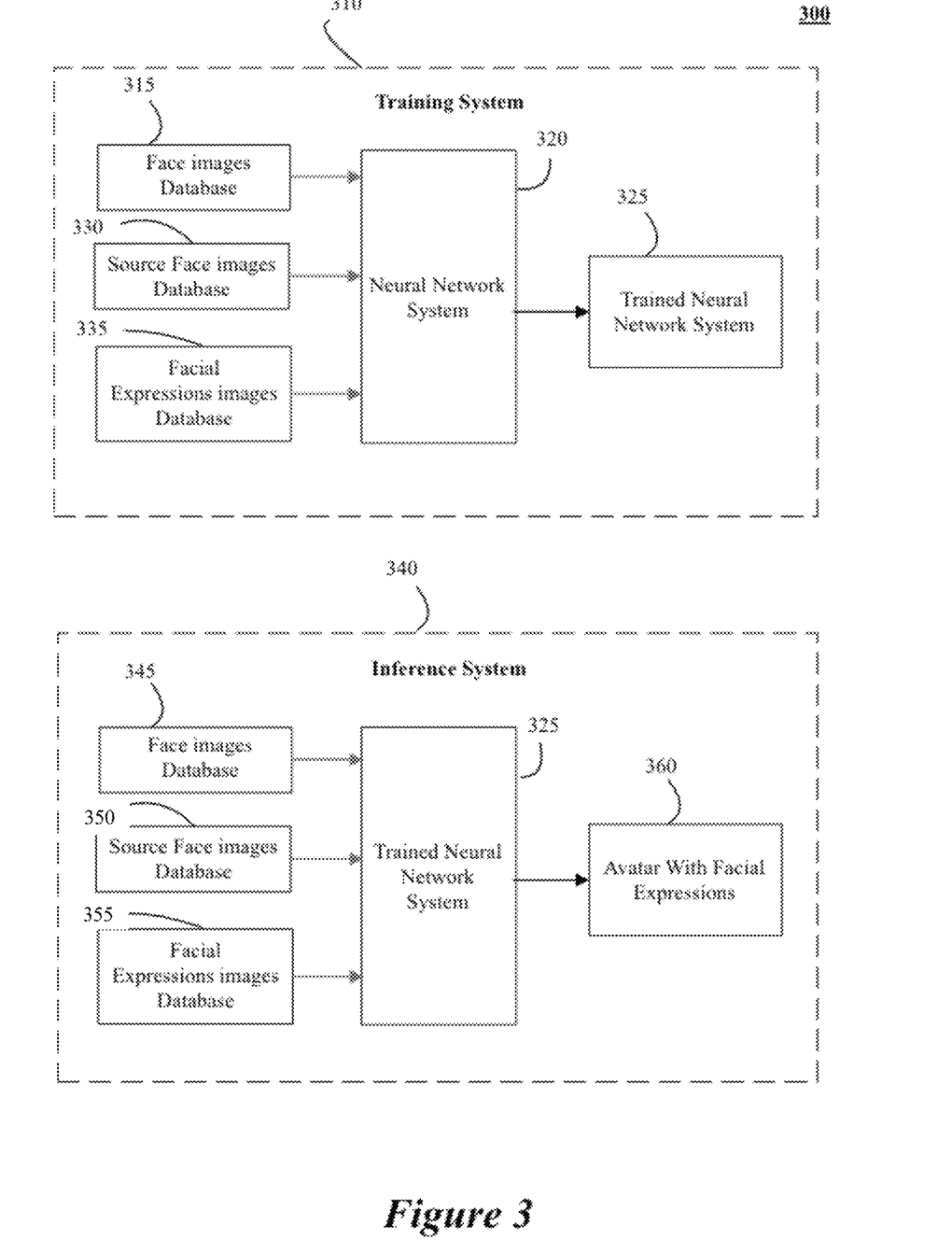
FIG. 3 illustrates a block diagram of a third system providing a facial expression and animation to the 3-D model of an avatar according to some demonstrative embodiments.
Figure 9:
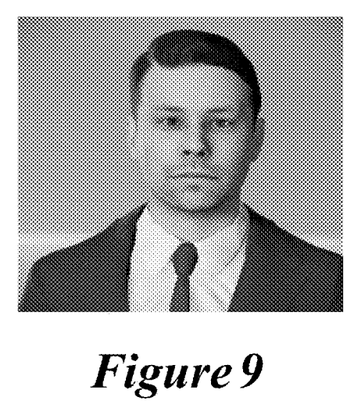
FIG. 9 is a 3D model image generated with the geometry of the real person, according to some demonstrative embodiments.
Figure 10:
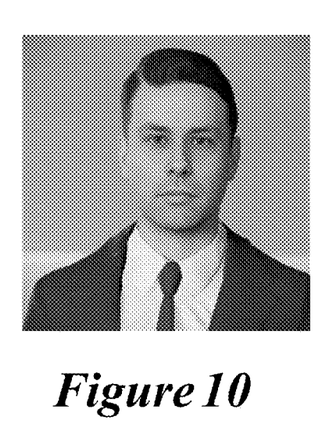
FIG. 10 is the image of FIG. 7 with a facial expression according to some demonstrative embodiments.

Reference is now made to FIG. 3, which illustrates a block diagram of a system 300 for providing facial expression and animation to the 3-D model of an avatar and with example images of FIGS. 6, 9 and 10, according to some demonstrative embodiments.

In some demonstrative embodiments, system 300 may include a training system 310 configured to train an NN system 320 to produce a trained NN system 325. For example, the training system 310 may include a first database with different videos and/or images that have a face on them, e.g., a face images database 315, a second database that may serve as a source face, e.g., a source face images database 330, a third database with a different human face is presented, which serve as driving video for driving face expressions, e.g., facial expressions images database 335, and a learning system, e.g., NN system 320, having one or more neural networks, which may be configured to learn how to replace faces from images or videos of the first database with faces from images or videos of the second database to maintain face expression based on an image and/or a video frame and/or a video from the third database.

In some demonstrative embodiments, system 300 may be configured to: at a training stage, train the learning system, e.g., NN system 320, to learn to replace a face on at least one frame of a video received from a first database of images and videos, e.g., face images database 315, with images and video received from a second database, e.g., source face images database 330, comprised of source face images and videos and with videos and images received from a third database, e.g., facial expressions images database 335, to drive face expressions, wherein the images or the videos comprise one or more faces, to generate a trained system, e.g., trained NN system 325.

In some demonstrative embodiments, system 300 may include an inference system 340 which may be configured to produce an avatar with facial expressions 360. For example, the inference system 340 may include a first database with different videos and/or images that have a face on them, e.g., a face images database 345, a second database which serve as a source face, e.g., a source face images database 350, a third database with different a human face is presented, which serve as driving video for driving face expressions, e.g., facial expressions images database 355, and a trained NN system, e.g., the trained NN system 325.

For example, the trained NN system 325 may include one or more neural networks, which may be configured to replace faces from images or videos of the first database, e.g., face images database 345, with faces from images and/or videos of the second database, e.g., source face images database 350, to maintain face expression based on an image and/or a video frame and/or a video from the third database, e.g., facial expressions database 355.

In some demonstrative embodiments, at an inference stage, the inference system 340 may be configured to use the trained NN system 325 to replace a face in a received target image or video, e.g., selfie photo or video, processed based on image and/or video taken from a camera of the user, with a received source face image or video, for example, from a camera of the user, and a received source face image or video used to drive face expressions to produce from the target image or video a new image or video of the source face with expression on it on the target image or video.

The example below demonstrates the replacement process by system 300.

The process may start by receiving an image of the real person (FIG. 6). From this image, a 3D model image is generated with the geometry of the real person, as shown in FIG. 9. It should be understood that the image of FIG. 8 does not have to have blended shapes.

In the next step, the trained NN system 325 may replace the texture of the avatar (FIG. 8) with the person's texture (FIG. 9) to provide the image shown by FIG. 10.

Advantageously, in games, systems 100, 200, and/or 300 may provide a new level of quality for rendering heads and faces. It allows much higher realism than existing methods. The games that are intended to be realistic become very realistic. In telecommunication, systems 100, 200, and/or 300 may provide a novel medium that can replace a common "video stream" medium. The benefits are that the user can customize the appearance and always look well. It reduces the number of bytes one user should send to another, thus enabling better image quality with lower internet connection quality. This may also include VTubing, retail commercials recording/streaming, and recording/streaming media for marketing. In visual effects (VFX) and the movie industry, the movie industry strives for bleeding-edge technologies to get maximum realism for virtual characters. But the amount of manual work is huge, thus making production expensive.

Figure 4:
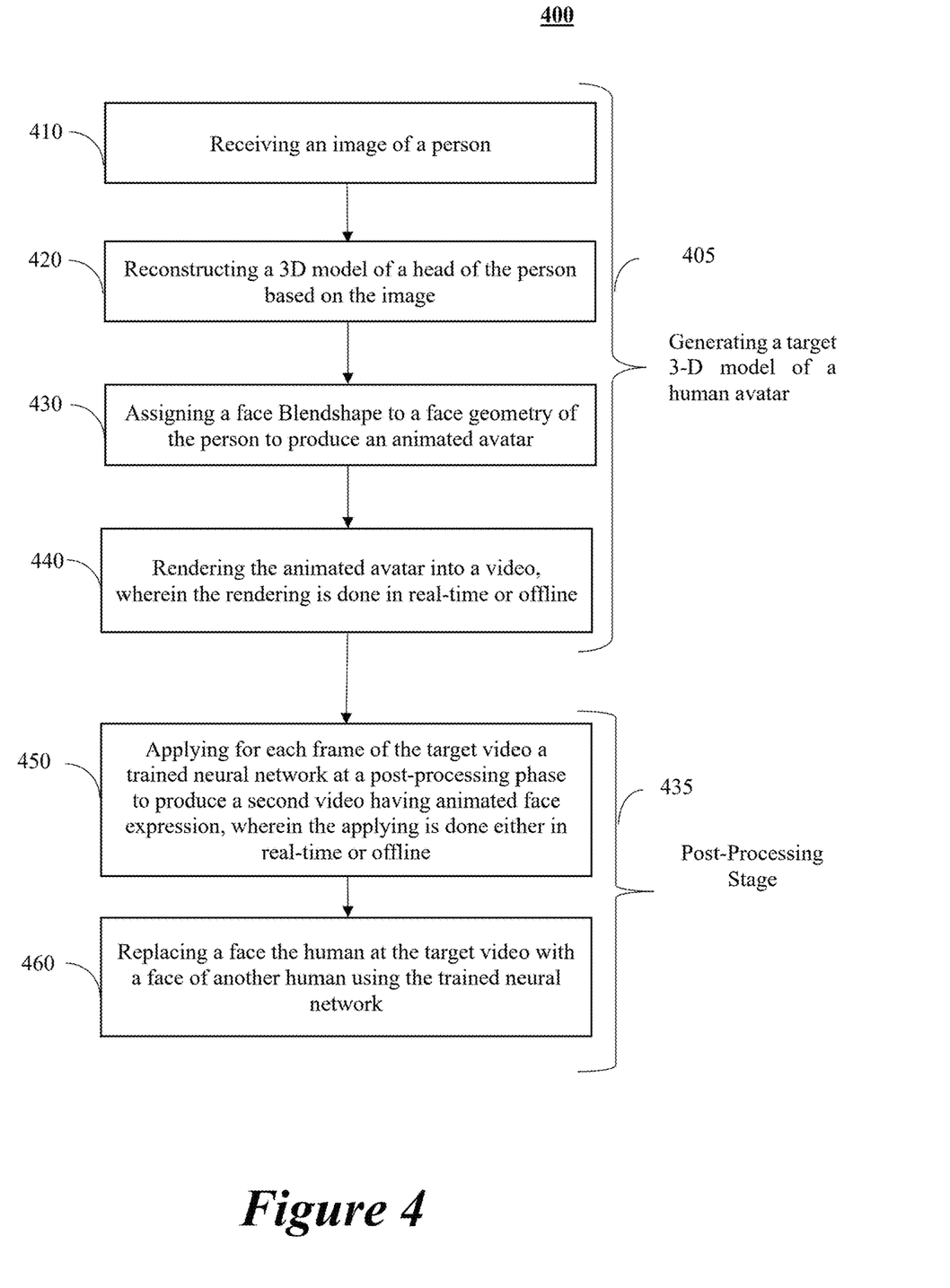
FIG. 4 illustrates a flow chart of a method of providing facial expression and animation to the 3-D model of an avatar according to some demonstrative embodiments.

Reference is made to FIG. 4, which illustrates a flow chart of a method 400 of providing facial expression and animation to the 3-D model of an avatar according to some demonstrative embodiments.

In some demonstrative embodiments, method 400 may include at least two stages, 405 and 435. The first stage 405 may include generating a target avatar of a human having facial expression, and the second stage 435, the post-processing stage, may include replacing the target face of a human with a source face.

In some demonstrative embodiments, first stage 405 may include taking a photo of a person (text box 410), such as, for example, a selfie photo. Reconstructing a 3D model of a head of the person based on the photo (text box 420). Assigning personalized and/or generic face Blendshapes to a face geometry of the person to produce an animated avatar (text box 430). Rendering the animated avatar into a video, wherein the rendering may be in real-time or offline (text box 440).

In some demonstrative embodiments, second stage 435 may include applying for each frame of the target video a trained neural network at a post-processing phase to produce a second video with an animated facial expression, wherein the applying is done either in real-time or offline (text box 450). The trained neural network may replace the face of the human in the target video with the face of another human using the trained neural network (text box 460). It should be understood that the above-described neural network may be a system of neural networks. It should also be understood that this disclosure is not limited to human face only, and it can be used to replace any face, e.g., an animal face or creature face, with another face.

In some demonstrative embodiments, the trained neural network may replace the rendered target face with the source face of a person to upgrade the quality of the avatar and the quality of the animations.

Advantageously, embodiments of this disclosure may produce a highly realistic look of the face with lower computing power. The computational power to achieve the same level of realism is lower than the prior art methods.

Furthermore, embodiments of this disclosure may reduce human work for crafting shaders. For example, shaders are hand-crafted by graphics engineers. It took the industry 50 years to get to state-of-the-art shaders. On the contrary, the neural network is trained on real images; it automatically learns "realism" from data. NN may replace shaders, and the computational power that applies to the NN is much lower than a computational power that requires the processing of hundreds or thousands, e.g., 8000 shaders, to high levels of quality that are still unmatched by the realism that the post-processing the NN system delivers.

The results of the embodiments of this disclosure are better since: the NN system may fix the mismatches between the Blendshapes and the person's actual face geometry and may fix other unknown parameters that were not applied by shaders, as it has the data embedded within the NN system and the data set that it was trained on, for example, change of light at the scene.

It should also be understood that the embodiments, implementations, and/or arrangements of the systems and methods disclosed herein can be incorporated as a software algorithm, application, program, module, or code residing in hardware, firmware, and/or on a computer useable medium (including software modules and browser plug-ins) that can be executed in a processor of a computer system or a computing device to configure the processor and/or other elements to perform the functions and/or operations described herein.

It should be appreciated that according to at least one embodiment, one or more computer programs, modules, and/or applications that, when executed, perform methods of the present invention need not reside on the single computer or processor but can be distributed in a modular fashion amongst a number of different computers or processors to implement various aspects of the systems and methods disclosed herein.

Thus, illustrative embodiments and arrangements of the present systems and methods provide a computer-implemented method, computer system, and computer program product for processing code(s). The flowchart and block diagrams in the Figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s).

It should also be noted that, in some alternative implementations, the functions noted in the block can occur out of order noted in the figures. For example, two blocks shown in succession may be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by particular purpose hardware-based systems that perform the specified functions or acts or combinations of specialized purpose hardware and computer instructions.

The terminology used herein is to describe particular embodiments only and is not intended to be limiting the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein are for the purpose of description and should not be regarded as limiting. The use of "including," "comprising," or "having," "containing," "involving," and variations thereof herein is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described and without departing from the true spirit and scope of the present invention, which is set forth in the following claims.

What is claimed is:

1. A system for providing a facial expression to one or more video frames of a virtual avatar comprising:
 a training system configured to train a neural network system to replace a face of the virtual avatar with a source face and to provide a facial expression of the source face to the face of the virtual avatar in real-time; and
 an inference system configured to use the trained neural network system to provide one or more facial expressions of the source face to the face of the avatar in real-time to cause the one or more facial expressions of the avatar to imitate the one or more facial expressions of a source face media which is represented by the virtual avatar by reconstructing a three dimensional (3D) model of a face of the virtual avatar, animate the face of the virtual avatar by reconstructing geometry of the 3D model, render the animated face of the virtual avatar and apply to the rendered virtual avatar the trained neural network system in a post-processing phase.

2. The system of claim 1, wherein the training of the neural network system comprises:
 train at least one neural network of the neural network system to replace a face of at least one image received from a first database with at least one source face image received from a second database to generate the trained neural network system.

3. The system of claim 2, wherein the first database comprises a plurality of videos and images of faces.

4. The system of claim 2, wherein the second database comprises a plurality of videos and images of faces that are configured to be used as source faces.

5. The system of claim 2, wherein the inference system is configured to:
 use the trained neural network system to replace a face in a target image from the first database with a source face image from the second database, add facial expressions to the source face image and to provide the source face with facial expressions on the virtual avatar.

6. The system of claim 2, wherein images of the first database and images of the second database comprise video with one or more frames.

7. The system of claim 2, wherein the inference system is configured to:
 use the trained neural network system to replace a face in a target image from the first database with a predetermined face image from the second database to provide the source face with facial expressions on the virtual avatar.

8. The system of claim 2 comprises a third database, wherein the third database comprises a plurality of images that serve as facial expressions.

9. The system of claim 8, wherein the training of the neural network system comprises:
 train at least one neural network of the neural network system to replace a face of at least one image received from the first database with at least one source face image received from the second database and images received from the third database to drive face expressions to generate a trained neural network system.

10. The system of claim 9, wherein the inference system is configured to:
 use the trained neural network system to replace a face in a target image from the first database with a source face image from the second database, and use the plurality of images from the third database to drive face expressions to the source face of the virtual avatar.

11. A method for providing a facial expression to one or more video frames of a virtual avatar processed by a neural network system comprising:
 training a neural network system to replace a face of the virtual avatar with a source face and to provide a facial expression of the source face to the face of the avatar in a real-time at a training phase using a neural network training system; and
 providing by an inference system configured to use the trained neural network system to one or more facial expressions of the source face to the face of the avatar in real-time to cause the one or more facial expressions of the avatar to imitate the one or more facial expressions of a source face media which is represented by the virtual avatar by reconstructing a three dimensional (3D) model of a face of the virtual avatar, animating the face of the virtual avatar by reconstructing geometry of the 3D model, rendering the animated face of the virtual avatar and apply to the rendered virtual avatar the trained neural network system in a post-processing phase.

12. The method of claim 11, wherein the training of the neural network system comprises:
 at the training phase, training at least one neural network of the neural network system to replace a face of at least one image received from a first database with at least one source face image received from a second database; and
 generating the trained neural network system.

13. The method of claim 12, wherein the first database comprises a plurality of videos and images of faces.

14. The method of claim 12, wherein the second database comprises a plurality of videos and images of faces that are configured to be used as source faces.

15. The method of claim 12, processed by the inference system, comprises:
 using the trained neural network system to replace a face in a target image from the first database with a source face image from the second database, add facial expressions to the source face image and to provide the source face with facial expressions on the virtual avatar.

16. The method of claim 12, wherein images of the first database and images of the second database comprise video with one or more frames.

17. The method of claim 12, proposed by the inference system, comprises:
 using the trained neural network system to replace a face in a target image from the first database with a predetermined face image from the second database to provide the source face with facial expressions on the virtual avatar.

18. The method of claim 12, wherein the system comprises a third database containing a plurality of images that serve as facial expressions.

19. The method of claim 18, wherein the training of the neural network system comprises:
 training at least one neural network of the neural network system to replace a face of at least one image received from the first database with at least one source face image received from the second database and images received from the third database to drive face expressions to generate a trained neural network system.

20. The method of claim 19, processed by the inference system, comprises:

using the trained neural network system to replace a face in a target image from the first database with a source face image from the second database, and using the plurality of images from the third database to drive face expressions to the source face of the virtual avatar.

\* \* \* \* \*